United States Patent [19]

Sylvester et al.

[11] Patent Number: 4,640,790

[45] Date of Patent: Feb. 3, 1987

[54] DISPERSANT COMPOSITION FOR MAGNETIC MEDIA

[75] Inventors: Judith M. Sylvester, Midland; David J. Kimball, Remus, both of Mich.

[73] Assignee: Dow Corning Corporation, Midland, Mich.

[21] Appl. No.: 885,109

[22] Filed: Jul. 14, 1986

[51] Int. Cl.$^4$ .......... C04B 35/04; H01F 1/26; C07F 9/02

[52] U.S. Cl. .................. 252/62.54; 252/351; 252/389.22; 252/389.31; 427/128; 428/694; 428/900; 556/405

[58] Field of Search .......... 556/405; 252/62.54, 252/351, 389.22, 389.31; 427/128

[56] References Cited

U.S. PATENT DOCUMENTS

| | | | |
|---|---|---|---|
| 3,639,440 | 2/1972 | Kampe et al. | 556/405 |
| 3,694,479 | 9/1972 | Groenhof | 556/405 |
| 3,840,577 | 10/1974 | Kodama et al. | 556/405 |
| 4,018,968 | 4/1977 | Neumann et al. | 252/62.54 |
| 4,076,890 | 2/1978 | Yamada et al. | 428/337 |
| 4,093,641 | 6/1978 | Plueddemann | 556/405 |
| 4,271,234 | 6/1981 | Schonafinger et al. | 428/405 |
| 4,369,230 | 1/1983 | Kimura et al. | 252/62.54 |
| 4,370,255 | 1/1983 | Plueddemann | 252/389 A |
| 4,419,257 | 12/1983 | Frew et al. | 252/62.54 |
| 4,420,537 | 12/1983 | Hayama et al. | 252/62.54 |
| 4,438,156 | 3/1984 | Homola et al. | 427/57 |
| 4,469,751 | 9/1984 | Kobayashi | 252/62.54 |
| 4,501,795 | 2/1985 | Takeuchi et al. | 428/329 |
| 4,501,800 | 2/1985 | Fujiki et al. | 252/62.54 |
| 4,540,627 | 9/1985 | Ishizawa | 252/62.54 |

FOREIGN PATENT DOCUMENTS

59-132417  7/1984  Japan .................. 252/62.54

OTHER PUBLICATIONS

Galashina et al., Clasticheskiye Massey, #4(1962), pp. 16-19.

*Primary Examiner*—Arthur P. Demers
*Attorney, Agent, or Firm*—Alexander Weitz

[57] ABSTRACT

An improved dispersant for magnetic media, comprising the reaction product of a phosphate ester and an alkali siliconate silylalkylphosphonate, is described. The dispersant can provide comparable magnetic properties in magnetic media at lower levels than are necessary for currently employed phosphate ester dispersants. A magnetic coating composition and a process for producing magnetic recording media, based on said improved dispersant, are also disclosed.

20 Claims, No Drawings

DISPERSANT COMPOSITION FOR MAGNETIC MEDIA

This invention relates to a magnetic recording medium. More particularly, this invention relates to a dispersant for magnetic pigment particles in a magnetic coating composition which is used to produce a medium showing excellent magnetic properties.

BACKGROUND OF THE INVENTION

Magnetic media conventionally comprise a magnetic coating on a non-magnetic substrate (support). The magnetic coating, which is generally applied as a suspension in an organic solvent and is subsequently dried, is basically made of fine magnetic pigment particles, such as iron oxide, dispersed in a polymeric resin binder, but may also contain lubricants and other additives. For many applications, such as video tape, computer tape, audio tape, floppy disks and rigid disks, the magnetic properties of the magnetic coating must be optimized in order to take advantage of the increased sophistication and capabilities of modern recording and computer hardware. Thus, for example, squareness ratio (SR) should be as high as possible, coercivity (Hc) should be high and switching field distribution (SFD) should be kept low. These properties are readily calculated from a magnetization curve (B- H curve) as illustrated, for example, in U.S. Pat. No. 4,438,156. Squareness ratio is equal to the quotient of retained magnetic flux divided by maximum magnetic flux and high values indicate greater retention of information stored in the magnetic media. Coercivity is a measure of the difficulty of erasing a recorded signal and high values result in improved "protection" of stored information. Switching field distribution is a measure of the variation in particle coercivity in a magnetic medium. A small SFD gives a well defined recording zone and increased output at short wavelengths. Of these variables, the squareness ratio is most important; it represents the effectiveness of the dispersion of magnetic particles, and high values result in increased long wavelength output of the magnetic medium.

Superior magnetic properties can, however, only be attained when the magnetic pigment is well dispersed in the medium, such that the individual magnetic particles do not interfere with each other. Unfortunately, the magnetic pigments, which are of microscopic dimensions, are difficult to disperse and often tend to agglomerate in the magnetic coating compositions. This difficulty has been resolved in the art to some degree by including a dispersant in the magnetic coating composition.

Early formulations employed small quantities of the natural product lecithin, or a phosphate ester, as dispersant. Use of a phosphate ester dispersant to achieve good dispersion, improved durability and reduced discontinuities is claimed in U.S. Pat. No. 4,419,257 to Frew et al. Therein, the phosphate ester is combined with a solvent system, which includes a dibasic ester, and said solvent system has specific Hansen three-dimensional solubility parameter values. Such dispersants do improve the dispersion quality in a magnetic coating composition, but they can not chemically bind to the pigment particles, and so are free to migrate within the magnetic coating composition, even when the latter is dried onto a substrate to form the magnetic medium. This free dispersant tends to plasticize (i.e., soften) the polymeric binder as well as migrate to the surface of a finished magnetic medium where it can, for example, mix with lubricant and thereby adversely affect frictional properties. Once at the surface of a magnetic medium, the dispersant can potentially oxidize, pick up debris or deposit on recording heads. These undesirable effects often become more pronounced as the amount of dispersant which is added to the magnetic coating composition is increased. Such an increase of dispersant level is generally necessary when high surface area or metal pigments are employed. Furthermore, the plasticization of the binder and ability of the dispersant to migrate away from the magnetic particles, even when the magnetic coating composition has dried, may permit some particle re-agglomeration which, in turn, leads to inferior magnetic properties with time. Because of such disadvantages, it is desirable to reduce the amount of phosphate ester dispersant in magnetic coating compositions.

Organosilanes having hydrolyzable groups have been employed in the art to improve dispersion. These materials are believed to form physiochemical bonds with reactive groups on the surface of the magnetic pigment. Moreover, silane coupling agents, which also contain functionality capable of reacting with the binder resin of a magnetic coating composition, may be employed. Thus, for example, Schonafinger et al., in U.S. Pat. No. 4,271,234, disclose the treatment of iron oxide pigment with various silanes including alkyltrimethoxysilane, vinyltrimethoxysilane, gamma-glycidyloxypropyltrimethoxysilane, gamma-aminopropyltriethoxysilane and methacryloxyethyltrimethoxysilane. When this treated iron oxide is formulated into a magnetic coating, improved dispersion of the pigment, as well as increased durability of the magnetic coating, is reported.

Chlorosilane and alkoxysilane coupling agents are taught by Yamada et al., in U.S. Pat. No. 4,076,890, to modify a magnetic coating mixture. In this case, a large number of silanes is disclosed, and incorporation of the silane into the composition may be by way of treating the magnetic pigment or by direct addition to said composition. The resulting magnetic media are claimed to be abrasion resistant and improved with respect to adhesion between magnetizable layer and support substrate, thereby exhibiting reduced powder dusting from tape edges.

The reaction product of a phosphoric ester with an polyisocyanate compound having at least two isocyanate groups, or an isocyanate compound having a hydrolyzable alkoxysilane, is disclosed by Takeuchi et al. in U.S. Pat. No. 4,501,795. When this reaction product is employed as a dispersant in a magnetic coating composition, good dispersibility of the magnetic powder and excellent durability of the magnetic layer (coating) are said to result.

Kimball, in copending application, Ser. No. 874,751, filed on June 16, 1986 and assigned to the assignee of this invention, discloses a dispersant for magnetic media which is the reaction product of a phosphate ester and certain organofunctional alkoxysilanes. The dispersant is said to be able to form chemical attachments with reactive groups on the magnetic particles and impart improved magnetic properties when compared with either the silanes alone or with the reaction products of phosphate ester and isocyanate-functional alkoxysilanes.

SUMMARY OF THE INVENTION

It has now been found that the reaction product of a phosphate ester and an alkali siliconate silylalkylphosphonate is a good dispersant for magnetic pigments. Surprisingly, the compositions of this invention impart improved magnetic properties at lower dispersant levels than observed when a phosphate ester alone is employed as the dispersant.

This invention thus relates to a dispersant composition comprising the reaction product of: (a) from about 3 to 9 parts by weight of a phosphate ester represented by the formula

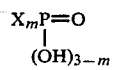

wherein X is independently selected from the group consisting of RO—, RO(R'O)$_n$— and

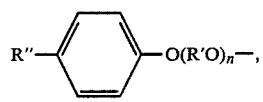

in which R represents an alkyl radical having from 2 to 18 carbon atoms, R' is an alkylene group having 2 to 4 carbon atoms, R" is an alkyl radical having 6 to 18 carbon atoms, n is an integer between 1 and 150 and the average value of m is between 1 and 2; and (b) from about 1 to 7 parts by weight of an alkali siliconate silylalkylphosphonate represented by the formula

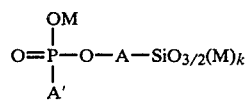

wherein A' is a hydrocarbon radical having from 1 to 18 carbon atoms, A is a divalent aliphatic hydrocarbon radical containing to 4 carbon atoms or the benzylene radical, M is a cation selected from the group consisting of sodium, potassium, lithium, rubidium, ammonium and tetraorgano ammonium and k may have an average value of 0 to 3.

This invention further relates to a magnetic coating composition comprising: magnetic pigment particles; a binder for said particles; and a dispersant for said particles, wherein said dispersant is the above described composition.

This invention also relates to a process for producing a magnetic recording medium comprising:
(i) mixing magnetic pigment particles, a binder for said particles, a dispersant and an inert organic solvent capable of dissolving said binder, to obtain a uniform dispersion thereof;
(ii) coating said dispersion onto a non-magnetic substrate;
(iii) orienting said magnetic pigment particles in a magnetic field; and
(iv) removing said solvent from the coated substrate, said dispersant being the above described composition.

DETAILED DESCRIPTION OF THE INVENTION

The dispersant of the present invention is the reaction product of a phosphate ester and an alkali siliconate silylalkylphosphonate. This dispersant may be advantageously combined with magnetic pigment particles, a binder for said particles and an inert solvent for said binder, to produce a wet magnetic coating composition. The wet magnetic coating composition may, in turn, be coated onto a non-magnetic substrate and dried to form a magnetic recording medium.

The dispersant of this invention imparts improved dispersion of the magnetic pigment particles in the magnetic coating composition, as evidenced by improved squareness ratio (SR), coercivity (Hc) and switching field distribution (SFD) of the resultant magnetic medium, particularly at reduced levels relative to phosphate ester dispersants now widely employed in the art.

The phosphate ester of the present invention may be represented by the formula

 (I)

wherein X may be independently selected from the group consisting of RO—, RO(R'O)$_n$— and

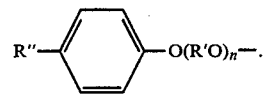

In the above formula, R represents a branched or linear alkyl radical having from 2 to 18 carbon atoms, such as propyl, n-hexyl, 2-ethylhexyl, n-octyl or stearyl. R' is an alkylene group having 2 to 4 carbon atoms, such as ethylene or tetramethylene. R" is a branched or linear alkyl radical having 6 to 18 carbon atoms, such as octyl, nonyl, decyl or dodecyl. Herein, n is an integer which may range from 1 to 150, inclusive. Blends of phosphate esters may be used for the purposes of this invention such that m, in the above formula, may have an average value between 1 and 2.

Examples of phosphate esters which may be employed in the instant invention include monododecyl phosphate, didodecyl phosphate, monododecylpolyoxyethylene phosphate, monooctadecylpolyoxyethylene phosphate, dioctylpolyoxyethylene phosphate, monononylphenol polyoxyethylene phosphate and dinonylphenol polyoxyethylene phosphate.

In preferred embodiments of the invention, the phosphate ester is a blend of mono and di-esters wherein X is either RO(CH$_2$CH$_2$O)$_n$— or

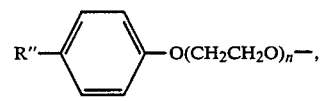

in which alkyl groups R and R" each have from 8 to 12 carbon atoms, n is 5 to 40 and m is about 1.5. These compounds are particularly preferred when the acid number of the phosphate ester blend, determined at the first inflection point of pH=5–5.5, is between about 60 and 120. A most preferred phosphate ester is one wherein X is

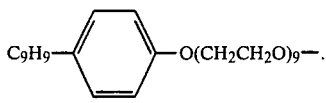

The phosphate esters of this invention are well known in the art and many of them are commercially available. They may be prepared by the reaction of phosphoric acid with the corresponding organic alcohol.

The alkali siliconate silylalkylphosphonate, which is reacted with the above mentioned phosphate ester to form the dispersant of this invention, may be represented by the formula $$O=\overset{\overset{\displaystyle OM}{|}}{\underset{\underset{\displaystyle A'}{|}}{P}}-O-A-SiO_{3/2}(M)_k \qquad (II)$$

wherein A' is a hydrocarbon radical having from 1 to 7 carbon atoms, such as methyl, ethyl, phenyl or halobenzyl. A in the above formula is a divalent aliphatic hydrocarbon radical containing 1 to 4 carbon atoms or the benzylene radical, examples being methylene, ethylene, 2-methyl propylene or trimethylene. M in formula (II) can be independently an alkaline cation selected from sodium, potassium, lithium, rubidium, ammonium and tetraorgano ammonium. Typical tetraorgano ammonium cations are tetramethyl ammonium and tetraethyl ammonium. In the preferred embodiment, A is —CH$_2$CH$_2$CH$_2$—, A' is methyl and M is a cation selected from sodium, potassium, ammonium or combinations thereof. Most preferred compositions result when M is sodium. In formula (II), the average number of alkali cations per molecule, k, may range from 0 to about 3, a value of about 0.1 being preferred.

Specific examples of alkali siliconate silylalkylphosphonate useful in the present invention may be represented by th formulae $$O=\overset{\overset{\displaystyle ONa}{|}}{\underset{\underset{\displaystyle Me}{|}}{P}}-O-CH_2CH_2CH_2SiO_{3/2}(Na)_{0.1},$$

wherein Me is the methyl group, $$O=\overset{\overset{\displaystyle OK}{|}}{\underset{\underset{\displaystyle Me}{|}}{P}}-O-CH_2CH_2CH_2SiO_{3/2}(K)_3,$$

$$O=\overset{\overset{\displaystyle O-NH_4}{|}}{\underset{\underset{\displaystyle Me}{|}}{P}}-O-CH_2CH_2CH_2SiO_{3/2}(NH_4)_3,$$

$$O=\overset{\overset{\displaystyle N(Me)_4}{\underset{\displaystyle O}{|}}}{\underset{\underset{\displaystyle Me}{|}}{P}}-O-CH_2CH_2CH_2SiO_{3/2}(N-Me_4)$$

-continued $$O=\overset{\overset{\displaystyle Na}{\underset{\displaystyle O}{|}}}{\underset{\underset{\displaystyle Et}{|}}{P}}-O-CH_2CH_2SiO_{3/2}(Na)_{1.5}$$

wherein Et is the ethyl group. These, and other, alkali siliconate silylalkylphosphonates may be employed individually, or in combination in forming the reaction products of this invention.

The alkali siliconate silylalkylphosphonate employed in this invention is well known to those skilled in the art and has been described in detail by Plueddemann in U.S. Pat. No. 4,370,255, hereby incorporated by reference.

Briefly, this compound is formed by saponification of the corresponding silylalkylester of phosphorous, also well known in the art. The latter compound may be prepared by a method such as that described in U.S. Pat. No. 4,093,641, hereby incorporated by reference. Briefly, the alkali siliconate silylalkylphosphonate is formed when the silylalkylester of phosphorous is refluxed in an aqueous solution of an alkali hydroxide for several hours. In this saponification step, the molar ratio of alkali hydroxide to silylalkylester of phosphorous may range from about 1:1 to 4:1, the preferred ratio being about 1.1:1. This molar ratio determines the value of k in formula (II) (e.g., when this ratio is 1.1:1, the value of k is 0.1; when the ratio is 4:1, k is 3). The extent of dilution during saponification is not considered critical, but total solids, on a weight basis, is preferably between about 10 and 60%. In practice, the aqueous solution as described is used to prepare the dispersant of this invention (i.e., without separating the solid alkali siliconate silylalkylphosphonate).

The dispersant of the present invention is prepared by reacting about 3 to 9 parts by weight, on a solids basis, of the phosphate ester with about 0.5 to 7 parts by weight of the alkali siliconate silylalkylphosphonate (solids basis), a weight ratio of about 1:1 of the reactants being preferred. This reaction can be effected by simply mixing the reactants at an elevated temperature of approximately 35° to 90° C. At the preferred temperature of 60° C., for example, the time required for the reaction is generally between about 16 hours and 8 days, preferably between 16 hours and 3 days. It is preferred to first dissolve the phosphate ester in an inert, water-immiscible solvent, such as cyclohexanone, and then to add this solution to the aqueous alkali siliconate silylalkylphosphonate solution. This results in a two phase system. After heating, the product still consists of two phases, the solvent phase (usually the top phase) being essentially a solution of the dispersant of this invention in said inert solvent. This solvent phase is decanted to separate the dispersant product.

The amount of dispersant needed to aid in the dispersion of magnetic pigment (described infra) depends on the specific surface area of the latter, and may readily be ascertained by those skilled in the art after a few simple experiments. In general, the minimum amount of the dispersant compatible with desired magnetic properties of the magnetic medium is employed. Thus, for example, when a cobalt-modified iron oxide pigment having a surface area of about 22 square meters per gram is used, about 2.6 to 5.0 parts per hundred parts of said pigment, on a weight basis, (pph) of dispersant is required, preferably about 4.0 pph. On the other hand, a similar pigment, having an area of about 42 square meters per gram, requires about 5.0 to 9.0 pph of the dispersant, preferably about 6.0 pph.

The magnetic pigment particles of this invention are well known in the art. These are finely divided ferromagnetic materials which may be oxides, such as iron oxide (e.g., gamma-ferric oxide), cobalt-modified iron oxide or chromium dioxide, or they may be metal alloys which comprise, in majority, a ferromagnetic metal such as iron, cobalt, nickel or alloys thereof. A preferred pigment is cobalt-modified iron oxide which has a length to breadth ratio of about 2:1 to 12:1, preferably about 6:1, and an average length of about 0.2 to 3 micrometers.

The binder employed in the present invention may be any suitable resin capable of binding the magnetic pigment particles to each other as well as to the non-magnetic substrate. These materials are also well known in the art, examples being polyurethane, poly(vinyl chloride), polyester, poly(vinylidene chloride), epoxy resin, poly(acrylonitrile), polyacrylic esters, polymethacrylic esters, polyamide, poly(vinyl acetal), poly(vinyl butyral), poly(vinyl pyridine), polycarbonate, polysulfone, phenol formaldehyde resin and melamine formaldehyde resin. A preferred binder is polyurethane. Typically, the binder content of the magnetic coating composition is between about 2 and 30 parts on a weight basis per 100 parts of the magnetic pigment in the composition.

In addition to the magnetic pigment particles, dispersant and binder, the magnetic coating compositions of this invention can contain various adjuvants known in the art to improve the final characteristics of the magnetic medium. Suitable adjuvants include lubricants, corrosion inhibitors, antistatic agents and polishing agents. Typically, the magnetic coating composition may contain from about 2 to about 10 parts by weight of such adjuvants, based on 100 parts (pph) of the magnetic pigment particles.

Suitable substrates in the present invention include polymers, such as polyethylene terephthalate, polyethylene, polypropylene, cellulose triacetate, polycarbonate and polyimides. Alternatively, the substrate may be a non-magnetic metal, such as aluminum, copper, tin, zinc, magnesium or alloys thereof. The form of the substrate is not critical, films, tapes, sheets, discs and drums being within the scope of this invention.

The present invention also relates to a process for producing a magnetic recording medium using the above described components.

First, a wet magnetic coating composition (dispersion) is prepared by simultaneously, or sequentially, introducing the magnetic pigment particles, dispersant, binder, an inert organic solvent and, optionally, adjuvants to a mixer such as a ball mill, two-roll mill, continuous media mill, sand mill, colloid mill or homogenizer and thoroughly mixing the ingredients till a good dispersion is attained. The inert organic solvent selected should be a good solvent for the binder. Examples of suitable solvents include cyclohexanone, methyl ethyl ketone, tetrahydrofuran, methyl isobutyl ketone, toluene and butyl acetate. In practice, the binder is preferably added in the form of a solution in one or more of these solvents. It is also preferred to pre-blend the magnetic coating composition, including solvent, using gentle agitation, such as rolling in a jar at room temperature for a period ranging from about 2 hours to about 48 hours, before mixing as described above.

Alternatively, the magnetic pigment may first be treated with the dispersant by mixing these two components along with the inert solvent and then mixing this combination with the binder and other ingredients, as above. In this case, the solvent may optionally be removed to form a treated magnetic pigment before said mixing operation.

The magnetic recording medium is prepared by applying the solvent-containing magnetic coating composition, described above, to a substrate, orienting the magnetic pigment particles in a magnetic field, and drying the coating. Application of the coating to the substrate may be accomplished by any of the usual methods known in the art, such as blade coating, reverse roll coating, and gravure coating. The removal of solvents, or drying, in commercial practice is best carried out at a temperature of about 60° to 85° C., preferably at about 75° C. However, the drying can be carried out at room temperature if desired. Dry coating thickness obtained can be varied according to the particular application but generally is kept between 0.75 and 20 micrometers.

EXAMPLES

The following examples are presented to further illustrate the compositions of this invention, but are not to be construed as limiting the invention, which is delineated in the appended claims. All parts and percentages in the examples are on a weight basis unless indicated to the contrary.

Example 1

The silylalkylester of phosporous having the structure

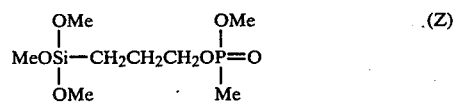

wherein Me represents the methyl radical, was prepared by a method described in Example 2 of U.S. Pat. No. 4,093,641. Forty-six parts of (Z) was added to a mixture of 15 parts of an aqueous 50% NaOH solution and 39 parts of water. This corresponds to a molar ratio of NaOH to (Z) of about 1.1:1. The combination was refluxed and the methanol which formed during saponification was removed by a thermal strip to a temperature of about 100° C. The product was adjusted to a total solids content of 50% with deionized water.

Example 2

The method described in Example 1, above, was followed wherein 46 parts of (Z) was added to 54 parts of an aqueous 50% NaOH solution. This corresponds to a molar ratio of NaOH to (Z) of about 4:1. The product was adjusted to a total solids content of 50% with deionized water.

Example 3

A blend of 71.5 parts of the siliconate silylalkylphosphonate product of Example 1 (solution basis) and 28.5 parts of an aqueous 50% KOH solution was prepared at room temperature. This corresponds to a molar ratio of KOH to (Z) of about 1.5:1. The product was adjusted to a total solids content of 50% with deionized water.

Example 4

The method described in Example 1, above, was followed wherein 49 parts of (Z) was added to 51 parts of an aqueous 50% NH₄OH solution. This corresponds to a molar ratio of NH₄OH to (Z) of about 4:1. The product was adjusted to a total solids content of 50% with deionized water.

Example 5

The method described in Example 1, above, was followed wherein 38 parts of (Z) was added to 62 parts of an aqueous 50% KOH solution. This corresponds to a molar ratio of KOH to (Z) of about 4:1. The product was adjusted to a total solids content of 50% with deionized water.

Examples 6-12

Gafac ® RE-610 (GAF Corp., Wayne, N.J.) surfactant is described as a blend of phosphate mono- and di-esters of the ethylene oxide-adduct type, having the general formulas

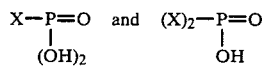

wherein X is

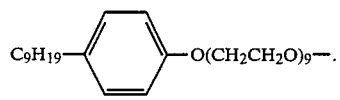

This surfactant is further described as a slightly hazy, viscous liquid, having a maximum moisture content of 0.5%, a specific gravity of 1.10 to 1.12, an acid number of 62-72 and a pH<2.5 (10% solution at 25° C.).

Two and one half grams of Gafac ® RE-610 was dissolved in tetrahydrofuran to form a 25% solution. This solution was mixed with 2.5 grams (solids basis) of the alkali siliconate silylalkylphosphonate compound of Example 1 in a glass one-ounce bottle which was then capped and heated in a water bath at 60° C. for 1 day. The reaction product was observed to consist of two separate phases. The top phase was decanted, and contained the dispersant reported as Example 6 in Table 1. The solids content of this top phase was determined to be 23% by evaporating a portion thereof in an air-circulating oven at 70° C. for 3 hours. In a similar fashion, the alkali siliconate silylalkylphosphonate compounds of Examples 2-5 were reacted with Gafac ® RE-610 to form the dispersants of Examples 7-10, also reported in Table 1.

For comparative purposes, the dispersant of Example 11 was prepared in a similar manner, this time by reacting just the compound (Z) (see Example 1) with Gafac ® RE-610. A control, based on Gafac ® RE-610 alone, was employed as the dispersant of Example 12. These comparative examples are also listed in Table 1. In the formation of the dispersants of the above examples, the Gafac ® RE-610 was added as a 25% solution in tetrahydrofuran in Examples 7 and 12 and as a 25% solution in cyclohexanone in Examples 8-11.

The dispersants of Examples 6-12 were employed to formulate magnetic media as follows. First a magnetic coating formulation was prepared by combining 20.0 g of Pferrico ® 2566 iron oxide pigment, 0.8 g dispersant (solids basis), 8.3 g Estane ® 5701 binder solution (12% in cyclohexanone) and 30.0 g cyclohexanone solvent. The dispersant content in these examples is thus 4 parts per hundred parts of said pigment (i.e., 4 pph).

Pferrico ® 2566 (Pfizer Pigments, Inc., New York, N.Y.) is described as a cobalt-modified iron oxide particle having a cobalt content of 3.0%. It is further defined as having average dimensions of 0.07 micron (width) by 0.40 micron (length), an acicularity ratio of 6.1 and a surface area of 22.5 m²/g. Estane ® 5701 (B. F. Goodrich Company, Cleveland, OH) is described as a polyester-based polyurethane resin.

Each magnetic coating composition was milled in a 5.5 oz stainless steel container filled with approximately 350 grams of steel balls having a diameter of about ⅛ in. The milling was accomplished by vibrating the container and its contents on a standard paint shaker for 15 minutes at room temperature.

After the above milling procedure, each composition was coated onto 1.42 mil thick video-grade poly(ethylene teraphthalate) film using a draw-down coating bar having a 1 mil gap at a coating speed of approximately one foot per second. Simultaneous to the coating procedure, the still wet magnetic coating was subjected to orientation by a 2,000 Gauss one-way magnet in a direction parallel to the draw axis. The coated film was allowed to dry at room temperature for at least one hour, whereupon two 20 inch-long by ⅜ inch-wide tape sections were cut longitudinally (i.e., along the draw direction) from said film. The tape sections were folded in half (lengthwise) and inserted into a 10 mm diameter glass sample tube for magnetic property evaluation as follows.

An LDJ B/H meter, model number 7500A (LDJ, Troy, MI), was used to determine the squareness ratio (SR), coercivity (Hc), and switching field distribution (SFD) at 22° C. using a frequency of 60 Hz and a longitudinally applied field of 3,000 Oe. At least 5 readings were taken for each sample and averaged to obtain the results reported in Table 1.

TABLE 1

MAGNETIC PROPERTIES OF MEDIA EMPLOYING REACTION PRODUCT OF SALTS OF ESTER (Z) AND GAFAC ® RE-610 AS DISPERSANT

| Example No. | Dispersant Composition (Employed at 4 phr) | SR | Hc (Oersteds) | SFD |
|---|---|---|---|---|
| 6 | Na Salt of (Z)* (Example 1) Reacted with Gafac ® RE-610 | 0.83 | 750 | 0.49 |
| 7 | Na Salt of (Z) (Example 2) Reacted with Gafac ® RE-610 | 0.80 | 749 | 0.50 |
| 8 | K/Na Salt of (Z) (Example 3) Reacted with Gafac ® RE-610 | 0.80 | 748 | 0.51 |
| 9 | NH₄ Salt of (Z) (Example 4) Reacted with Gafac ® RE-610 | 0.82 | 749 | 0.50 |
| 10 | K salt of (Z) (Example 5) Reacted with Gafac ® RE-610 | 0.82 | 749 | 0.49 |
| (Comparative) Example No. | | | | |
| 11 | (Z) Reacted with Gafac ® RE-610 | 0.78 | 748 | 0.54 |

TABLE 1-continued
MAGNETIC PROPERTIES OF MEDIA EMPLOYING REACTION PRODUCT OF SALTS OF ESTER (Z) AND GAFAC ® RE-610 AS DISPERSANT

| Example No. | Dispersant Composition (Employed at 4 phr) | SR | Hc (Oersteds) | SFD |
|---|---|---|---|---|
| 12 | Control (Gafac ® RE-610 only) | 0.82 | 769 | 0.52 |

*(Z) is $(MeO)_3SiCH_2CH_2CH_2OP=O$ with OMe and Me substituents
$$\text{(Z) is } (MeO)_3SiCH_2CH_2CH_2O\underset{Me}{\overset{OMe}{P}}=O$$
wherein Me is the methyl radical.

The dispersants of Example 6 and (Comparative) Example 12 were similarly employed to prepare magnetic media wherein said dispersant constituted only about 3 pph (solids basis). The results of magnetic evaluation of these media, reported in Table 2, show the excellent properties imparted by the dispersants of this invention, even at a reduced concentration of 2.7 pph.

TABLE 2
MAGNETIC PROPERTIES OF MEDIA EMPLOYING DIFFERENT LEVELS OF DISPERSANT

| Dispersant Example No. | Dispersant Composition | Dispersant Content per 100 Part Pigment | SR | Hc | SFD |
|---|---|---|---|---|---|
| 6 | Na Salt of (Z)* Reacted with Gafac ® RE-610 | 3.9 pph | 0.83 | 750 | 0.49 |
| 6 | Na Salt of (Z)* Reacted with Gafac ® RE-610 | 2.7 pph | 0.82 | 752 | 0.50 |
| (Comparative Dispersant) Example No. | | | | | |
| 12 | Gafac ® RE-610 | 4.0 pph | 0.82 | 769 | 0.52 |
| 12 | Gafac ® RE-610 | 3.0 pph | 0.80 | 747 | 0.51 |

*(Z) is $(MeO)_3SiCH_2CH_2CH_2O\underset{Me}{\overset{OMe}{P}}=O$
wherein Me is the methyl radical.

Examples 13–16

The procedures described above were followed to prepare magnetic media based on dispersants similar to the compound of Example 6. The dispersants were employed at 4 pph. In these examples, the Gafac ® RE-610 was added as a 25% solution in cyclohexanone during the formation of the dispersants. The ratio of the reactant of Example 1 to Gafac ® RE-610, on a solids basis, was varied according to the values reported in the second column of Table 3.

TABLE 3
MAGNETIC PROPERTIES OF MEDIA EMPLOYING REACTION PRODUCT OF EXAMPLE 1 AND GAFAC ® RE-610 AS DISPERSANT

| Example No. | Ratio of Reactant of Example 1 to Gafac ® RE-610 | SR | Hc | SFD |
|---|---|---|---|---|
| 13 | 7:3 | 0.81 | 752 | 0.50 |
| 14 | 3:7 | 0.81 | 751 | 0.50 |
| 15 (Comparative) Example No. | 0.5:9 | 0.82 | 749 | 0.50 |
| 16 | 9:1 | 0.76 | 754 | 0.56 |

Examples 17–20

The dispersant of Example 6 was used to prepare magnetic media, according to the above methods, wherein the milling time was increased to 60 minutes. Different dispersant levels and a high surface area magnetic pigment, Pferrico ® 5090 (Pfizer Pigments, Inc., New York, N.Y.), were employed. Pferrico ® 5090 is described as a cobalt-modified iron oxide for high density recording media. The surface area of these particles is 41.9 square meters per gram, average dimensions are 0.04 micron (width) by 0.2 micron (length), average aspect ratio is 5.5, pH is 8.8 and coercivity is 935 Oe. The magnetic properties of the resultant tapes are reported in Table 4. In Example 17, the Gafac ® RE-610 was added as a 25% solution in cyclohexanone and heating was extended to 3 days at 60° C. during the formation of the dispersant. 0 Comparative examples, again using Pferrico ® 5090 pigment, with no dispersant (Example 18) and only Gafac ® RE-610 as dispersant (Example 19), were similarly prepared and evaluated, the results also being shown in Table 4.

An additional comparative dispersant was prepared by heating 10 grams of gamma-chloropropyltrimethoxysilane with 10 grams of Gafac ® RE-610 in a capped 1-ounce vial at 60° C. for 24 hours. This dispersant was also used to prepare magnetic media based on Pferrico ® 5090 pigment. Test results on the corresponding magnetic tape (Example 20) are also presented in Table 4.

TABLE 4
MAGNETIC PROPERTIES OF MEDIA BASED ON PFERRICO ® 5090 AT VARIOUS DISPERSANT LEVELS

| Example No. | Dispersant | Amount | SR | Hc | SFD |
|---|---|---|---|---|---|
| 17 | Example 6 | 4 | 0.72 | 982 | 0.65 |
|  |  | 6 | 0.79 | 1001 | 0.58 |
|  |  | 8 | 0.79 | 999 | 0.57 |
| (Comparative) Example No. | | | | | |
| 18 | None | 0 | 0.67 | 919 | 0.76 |
| 19 | Gafac ® RE-610 | 4 | 0.66 | 920 | 0.77 |
|  |  | 6 | 0.77 | 965 | 0.61 |
|  |  | 8 | 0.80 | 972 | 0.59 |
| 20 | Reaction Product of Gafac ® RE-610 and gamma-chloropropyltrimethoxysilane | 4 | 0.65 | 925 | 0.80 |
|  |  | 6 | 0.70 | 940 | 0.70 |
|  |  | 8 | 0.78 | 984 | 0.59 |

This illustrates that lower levels of the dispersants of this invention are required to attain good magnetic properties than when prior art dispersants are employed.

(Comparative) Example 21

The method used to prepare Example 6 was repeated, except the reactants were not heated. This "cold-blend"

was used to prepare magnetic tape samples (with Pferrico® 2566 at 4 pph dispersant) which showed significantly inferior magnetic properties relative to the dispersant of Example 6, as reported in Table 5.

TABLE 5
COMPARISON OF REACTED AND UNREACTED EXAMPLE 1/ GAFAC® RE-610 BLEND

| Dispersant | SR | Hc | SFD |
|---|---|---|---|
| Example No. 6 (Comparative) | 0.83 | 750 | 0.49 |
| Example No. 21 | 0.79 | 744 | 0.51 |

This example demonstrates the need to form a reaction product between the siliconate silylakylphosphonate and Gafac® RE-610 rather than merely blending the two materials.

That which is claimed is:

1. A composition comprising the reaction product of: (a) from about 3 to 9 parts by weight of a phosphate ester represented by the formula

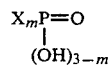

wherein X is independently selected -from the group consisting of RO—, RO(R'O)$_n$— and

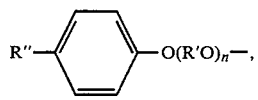

in which R represents an alkyl radical having from 2 to 18 carbon atoms, R' is an alkylene group having 2 to 4 carbon atoms, R" is an alkyl radical having 6 to 18 carbon atoms, n is an integer between 1 and 150 and the average value of m is between 1 and 2; and (b) from about 0.5 to 7 parts by weight of an alkali siliconate silylalkylphosphonate represented by the formula

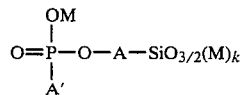

wherein A' is a hydrocarbon radical having from 1 to 18 carbon atoms, A is a divalent aliphatic hydrocarbon radical containing 1 to 4 carbon atoms or the benzylene radical, M is a cation selected from the group consisting of sodium, potassium, lithium, rubidium, ammonium and tetraorgano ammonium and k may have an average value of 0 to 3.

2. The composition of claim 1, wherein A is —(CH$_2$CH$_2$CH$_2$)—, A' is methyl and M is selected from the group consisting of sodium, potassium and ammonium.

3. The composition of claim 2, wherein M is sodium.

4. The composition of claim 1, wherein said phosphate ester component is a blend of a mono-ester and a di-ester, X is selected from the group consisting of RO(CH$_2$XH$_2$O)$_n$— and

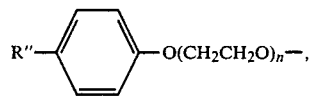

in which R and R" each have from 8 to 12 carbon atoms, n is between 5 and 40 and m is about 1.5.

5. The composition of claim 4, wherein A is —(CH$_2$CH$_2$CH$_2$)—, A' is methyl and M is selected from the group consisting of sodium, potassium and ammonium.

6. The composition of claim 5, wherein X is

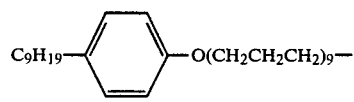

and said phosphate ester blend is further characterized as having an acid number between about 60 and 120.

7. The composition of claim 6, wherein M is sodium, and k has an average value of about 0.1.

8. A magnetic coating composition comprising magnetic pigment particles, a binder for said particles and a dispersant for said particles, wherein said dispersant is the composition of claim 1.

9. A magnetic coating composition comprising magnetic pigment particles, a binder for said particles and a dispersant for said particles, wherein said dispersant is the composition of claim 5.

10. The magnetic coating composition of claim 9, wherein said binder is polyurethane and said magnetic pigment particles comprise iron oxide, cobalt-modified iron oxide or a metal alloy of iron, cobalt or nickel.

11. A magnetic coating composition comprising magnetic pigment particles, a binder for said particles, and a dispersant for said particles, wherein said dispersant is the composition of claim 2.

12. The magnetic coating composition of claim 11, wherein said binder is polyurethane and said magnetic pigment particles comprise iron oxide, cobalt-modified iron oxide or a metal alloy of iron, cobalt or nickel.

13. A process for producing a magnetic recording medium comprising:
   (i) mixing magnetic pigment particles, a binder for said particles, a dispersant and an inert organic solvent capable of dissolving said binder, to obtain a uniform dispersion thereof;
   (ii) coating said dispersion onto a non-magnetic substrate;
   (iii) orienting said magnetic pigment particles in a magnetic field; and
   (iv) removing said solvent from the coated substrate, said dispersant comprising the reaction product of (a) from about 3 to 9 parts by weight of a phosphate ester represented by the formula

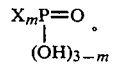

wherein X is independently selected from the group consisting of RO—, RO(R'O)$_n$— and

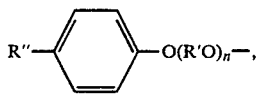

in which R represents an alkyl radical having from 2 to 18 carbon atoms, R' is an alkylene group having 2 to 4 carbon atoms, R" is an alkyl radical having 6 to 18 carbon atoms, n is an integer between 1 and 150 and the average value of m is between 1 and 2; and (b) from about 0.5 to 7 parts by weight of an alkali siliconate silylalkylphosphonate represented by the formula

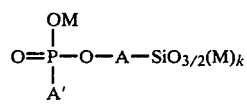

wherein A' is a hydrocarbon radical having from 1 to 18 carbon atoms, A is a divalent aliphatic hydrocarbon radical containing 1 to 4 carbon atoms or the benzylene radical, M is a cation selected from the group consisting of sodium, potassium, lithium, rubidium, ammonium and tetraorgano ammonium and k may have an average value of 0 to 3.

14. The process of claim 13, wherein A is —($CH_2CH_2CH_2$)—, A' is methyl and M is selected from the group consisting of sodium, potassium and ammonium.

15. The process of claim 13, wherein said phosphate ester component is a blend of a mono-ester and a di-ester, X is selected from the group consisting of $RO(CH_2CH_2O)_n$— and

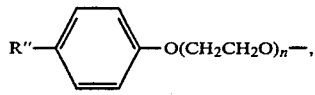

in which R and R" each have from 8 to 12 carbon atoms, n is between 5 and 40 and m is about 1.5.

16. The process of claim 15, wherein A is —($CH_2CH_2CH_2$)—, A' is methyl and M is selected from the group consisting of sodium, potassium and ammonium.

17. The process of claim 16, wherein X is

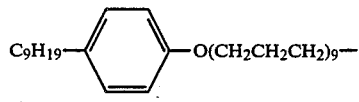

and said phosphate ester blend is further characterized as having an acid number between 60 and 120.

18. The process of claim 17, wherein M is sodium and k has an average value of about 0.1.

19. The process of claim 16, wherein said binder is polyurethane and said magnetic pigment particles comprise iron oxide, cobalt-modified iron oxide or a metal alloy of iron, cobalt or nickel.

20. The process of claim 14, wherein said binder is polyurethane and said magnetic pigment particles comprise iron oxide, cobalt-modified iron oxide or a metal alloy of iron, cobalt or nickel.

* * * * *